United States Patent Office 3,119,792
Patented Jan. 28, 1964

3,119,792
METAL AND METAL COMPOUND CATALYSTS
FOR POLYURETHANE PLASTICS
Heinz Schultheis, Cologne-Stammheim, Herbert Nordt, Leverkusen, and Wilhelm Kallert, Cologne-Stammheim, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Dec. 23, 1957, Ser. No. 704,344
Claims priority, application Germany Dec. 21, 1956
7 Claims. (Cl. 260—77.5)

This invention relates generally to the preparation of polyurethane plastics and, more particularly, to an improved process for making elastomeric or homogeneous plastics.

It has been proposed heretofore to prepare polyurethane plastics by a process wherein an organic compound having reactive hydrogens is reacted with an organic polyisocyanate and a crosslinking agent. The organic compound having reactive hydrogens may be a polyhydroxy compound, such as, for example, a polyester, polyesteramide, polyalkylene ether glycol, polythioether or polyacetal having terminal hydroxyl groups. The polyurethane may be prepared by reacting one of these compounds with an excess of the organic polyisocyanate to prepare an adduct or prepolymer having terminal isocyanate groups and this adduct may then be reacted with a cross-linking agent while the liquid reaction mixture is cast into molds to form the final plastic. In an alternate procedure, the organic compound having reactive hydrogen atoms is reacted with less than the equivalent amount of organic polyisocyanate to produce an adduct having terminal hydroxyl groups and this adduct or storage-stable intermediate may then be mixed with a cross-linking agent to form a compound which is reacted with further organic polyisocyanate to form the finished product. The cross-linked millable gum is usually reacted with the organic polyisocyanate while it is being processed on a rubber mill or any other suitable apparatus customarily used in compounding rubber. It has been the practice heretofore to add various types of catalysts to the reaction mixture to accelerate the reaction. The heretofore available catalysts have the disadvantage, however, of sometimes adversely affecting the color, structural strength, elasticity or aging characteristics of the polyurethane and are not adaptable to wide commercial application.

It is therefore an object of this invention to provide an improved process for making elastomeric, homogeneous or substantially non-porous rubber-like polyurethane plastics. Another object of the invention is to provide a method for making substantially non-porous rubber-like polyurethane plastics having improved color, structural strength, elasticity, aging characteristics and other physical characteristics. Still another object of the invention is to provide an improved method for catalyzing the reactions which produce a substantially non-porous rubber-like polyurethane plastic. A further object of the invention is to provide improved catalysts for the reactions which produce polyurethane plastics.

Generally speaking, the foregoing objects and others are accomplished in accordance with this invention by providing a method for making polyurethane plastics wherein the reactions between an organic compound having reactive hydrogens and an organic polyisocyanate are brought about in the presence of gold, zinc, cadmium, titanium, antimony or bismuth. One or more of these metals may be present in the reaction mixture either as the metal per se or as a suitable compound of the metal. In accordance with this invention, the organic compound having reactive hydrogen atoms is reacted with the organic polyisocyanate in the presence of the catalyst and a cross-linking agent may be added, if necessary, to produce the polyurethane.

It is preferred that the catalyst provided by this invention be an inorganic or organic compound present in crystalloid or colloidal form in the reaction medium either as the metal per se or in the form of a compound of the metal. Any suitable compound of one of the metals mentioned hereinbefore or the metal itself may be used, it only being necessary that the metal be present in the reaction mixture. Examples of suitable catalysts of the class provided include colloidal gold, aurochlorohydric acid, titanium tetrabutylate, zinc adipate, antimony-III-oxide, bismuth nitrate, cadmium chloride, or a complex of one of the metals, such as, for example, the titanium complexes of disalicylal ethylene diimine of the type disclosed by P. Pfeiffer and H. Thielert, B. 71, 1938, p. 121, or the like.

The catalyst provided by this invention may be used to advantage to accelerate the reaction between any suitable organic compound having reactive hydrogen atoms, organic polyisocyanate and, if necessary, cross-linking agent which react together to form a substantially non-porous rubber-like polyurethane plastic. Examples of organic compounds having reactive hydrogens include polyesters having terminal hydroxyl groups and prepared by esterification of a polycarboxylic acid and a polyhydric alcohol. Adipic acid, succinic acid, terephthalic acid, sebacic acid or any other suitable polycarboxylic acid may be reacted with the polyhydric compound to prepare the polyester. The polyhydric alcohol may be a diol, such as, for example, ethylene glycol, diethylene glycol, or, in some instances, a trihydric alcohol, such as, for example, glycerol, or trimethylol propane may be used in admixture with the diol. It is preferred that the polyester have an acid number of from 0 to about 2. The polyalkylene ether glycol may be prepared by condensing a lower alkylene oxide, such as, for example, ethylene oxide, propylene oxide, butylene oxide, or the like, or by condensing one of the oxides with a glycol or other polyhydric alcohol. Polythioether glycol may be prepared by condensation of a suitable thioglycol, such as, for example, thiodiglycol or the like. The organic compound having reactive hydrogen atoms should preferably have a molecular weight of at least about 500 and an hydroxyl number of not more than about 224.

Any suitable organic polyisocyanate may be reacted with the organic compound having reactive hydrogen atoms, such as, for example, 2,4-toluylene diisocyanate, 2,6-toluylene diisocyanate, p-phenylene diisocyanate, napthylene-1,5-diisocyanate, 4,4'-diphenyl dimethyl methane diisocyanate, diisocyanates containing urea or uretdione linkages or the like.

Any suitable cross-linking agent heretofore disclosed may be used, such as, for example, any suitable glycol, including ethylene glycol or diethylene glycol, an amino alcohol, such as, for example, ethanolamine, a diamine, such as, for example, ethylene diamine, or a suitable hydrazine or the like, may be used. In fact, it is to be understood that the catalyst provided by this invention may be used in preparing any homogeneous or substantially non-porous rubber-like polyurethane and that the invention is not limited to the use of the catalyst with any particular reaction components. Examples of other components of a polyurethane plastic which may be used are disclosed in U.S. Patents 2,621,166, 2,620,516, 2,729,618, 2,764,565, 2,778,810 and any of the processes for making substantially non-porous rubber-like polyurethanes disclosed therein may be accelerated with the catalyst provided by this invention.

Any amount of the metal catalyst provided by this invention will effect some acceleration of the reactions and any amount is therefore contemplated by the invention. However, in most instances, the quantity will be relatively small and it is preferred to use from about 0.01 percent to about 0.1 percent of the compound. It may be possible, however, to use even larger quantities in some cases, so the invention contemplates using any catalytic amount which does not interfere with the physical characteristics of the final product. Seldom will more than about 5 percent catalyst based on the weight of the reaction mixture be required.

It may be advantageous for these compounds to be previously admixed with one of the components required for the production of the plastic, this preferably taking place during the preparation of the component. In the preparation of a polyester from dicarboxylic acids and polyhydric alcohols for use in this invention, it is, for example, advisable to add a small quantity of gold chloride to the esterification mixture. The polyester being formed then contains the gold in dissolved form. It is also possible for the metal compound concerned to be admixed with the polyhydroxy compound after the latter has been prepared, or even to admix it with the cross-linking agent. It is in each case important that the reaction producing the plastic is carried out in the presence of one of the said metals. It is, in certain circumstances, sufficient for only the last stage of the reaction leading to the plastic to take place in the presence of the catalyst according to the invention.

In order better to describe and further clarify the invention, the following are specific embodiments thereof:

Example 1

About 1548 parts by weight of ethylene glycol and about 3285 parts of adipic acid are esterified to give a polyester with the OH number about 55 and an acid number of about 1.2. About 0.020 part by weight of gold trichloride is added at the commencement of the esterification. About 1000 parts by weight of the polyester prepared in this manner are stirred at about 126° C. with about 180 parts by weight of 1,5-naphthylene diisocyanate. After about 6 minutes, the reaction is practically completed, i.e., the temperature of the reaction mixture does not rise any further. About 20 parts by weight of 1,4-butylene glycol are incorporated by stirring into the thinly liquid melt and the mass is poured into waxed molds which are heated to about 110° C. The time available for the casting operation is about 3.5 minutes. A standard molded element can be removed from the mold after about 6 minutes.

An ester which was prepared in the same manner from adipic acid and ethylene glycol, but without any gold trichloride being added, produces under the same conditions by reaction with 1,5-naphthylene diisocyanate a reaction mixture which only reaches the maximum temperature after about 11 minutes. A standard molded element produced therefrom can only be taken from the mold after about 14–15 minutes, the time available for pouring being about 3.5 to about 4 minutes.

Example 2

About 1 part by weight of zinc adipate is dissolved at from about 60° C. to about 70° C. by stirring for several hours in about 2000 parts by weight of a polyester prepared by thermal esterification of about 175.2 parts by weight of adipic acid, about 128.2 parts by weight of diethylene glycol and about 8.1 parts by weight of trimethylol propane. This polyester is then mixed at about 100° C. with about 140 parts by weight of toluylene diisocyanate. The mixture is stirred for about 10 minutes, the temperature rising to about 107° C. and is then poured into waxed molds, in which the mass remains liquid for about 8 minutes, gradually becomes more viscous and solidifies within about 1.5 hours to provide a soft mass which retains its shape. The product represents a very valuable plastic for the production of printing cylinders. The Shore hardness is about 22.

However, if the reaction described above is conducted without adding zinc adipate, the mixture of toluylene diisocyanate and polyester has only reached a temperature of about 103° C. after about 15 minutes and, after the casting operation, it can only be removed from the mold after from about 2.5 to about 3 hours.

Example 3

About 500 parts by weight of a polyester prepared by thermal esterification of adipic acid and ethylene glycol, the initial components thereof having about 0.25 part by weight of cadmium chloride added thereto at the start of the esterification and the polyester having an OH number of about 52, are stirred at about 120° C. with about 67.5 parts by weight of 1,4-phenylene diisocyanate. The temperature of the mixture rises within about 4 minutes to about 129° C. After stirring for another 4 minutes, about 10 parts by weight of 1,4-butane diol are mixed therewith and the mixture is poured into waxed molds which are heated to about 110° C. A standard molded element can be removed from the mold after about 15 minutes. By heating for another 24 hours to about 105° C., a plastic is obtained which has very high tensile strength, notch toughness and resistance to oil and rubbing.

However, if the same polyester is processed in the same way but without adding cadmium chloride, the mixture with 1,4-phenylene diisocyanate only reaches a temperatureh of about 128° C. after about 7 minutes and the standard molded element prepared in the same way can only be removed from the mold after about 25 to 30 minutes.

Example 4

About 110 parts by weight of 1,5-naphthylene diisocyanate are incorporated by stirring at about 122° C. into about 500 parts by weight of a polythioether obtained from thiodiglycol and 1,4-butylene glycol in the mol ratio 1:1, the polythioether having an OH number of about 55. After about 6 minutes, the temperature of the reaction mixture does not rise any further and after about 18 parts by weight of 1,4-butylene glycol containing about 50 milligrams of titanium tetrabutylate have been incorporated by stirring for about 20 seconds, the mixture is poured into waxed molds heated to about 105° C. The mass remains thinly liquid for about 70 seconds and solidifies after about 8 minutes to provide a material with sufficiently high rigidity to allow it to be removed from the mold. After heating for another 24 hours at about 105° C., a resilient plastic is formed which is characterized by high resistance to oil and saponification.

By carrying out the same process without addition of titanium tetrabutylate to the 1,4-butylene glycol, however, it is necessary to wait about 12 to 16 minutes before the cast element can be removed from the mold.

Example 5

About 2000 parts by weight of a polyester which has been prepared from ethylene glycol and adipic acid by thermal esterification and which has an OH number of about 52, are mixed at about 110° C. with about 245 parts by weight of 1,4-phenylene diisocyanate. Previously, about 1.0 part by weight of disalicylal ethylene diimine-titanium hydroxy chloride have been admixed with the polyester. The temperature rises in about 6 minutes to about 132° C. After about 10 minutes, about 70 parts by weight of 1,4-butane diol are admixed therewith, the reaction mass is immediately discharged onto a heated sheet metal plate and after-treated for another 20 hours at about 110° C. A mass is formed which can be rolled and which is made suitable for vulcanization by admixing about 140 parts by weight of dimeric 1,2,4-toluylene diisocyanate on the roller. By pressing at about 140° C., a highly elastic plastic which resists rubbing is obtained in about 30 minutes, and this can be removed at about 80° C. The tensile strength of this material is about 280 kilograms per square centimeter with about 650% elongation. However, if the same process is carried out without adding disalicylal ethylene diimine-titanium hydroxy chloride to the polyester, the vulcanization in the press takes about 70–80 minutes before the element can be removed at 80° C.

*Example 6*

About 60 milligrams of antimonic acid triethyl ester are mixed at about 50° C. with about 400 parts by weight of a polybutylene glycol with the OH number of about 48. About 48 parts by weight of p-phenylene diisocyanate are then incorporated therein at about 95° C. by stirring. After about 4 minutes, the temperature of the reaction mixture stops rising and after adding a mixture of about 6 parts by weight of thiodiglycol and about 2.5 parts by weight of trimethylol propane, the reaction mixture is poured into waxed molds heated to about 110° C. A standard molded element cast in this manner can be removed from the mold after about 50 minutes. A resilient plastic is obtained which is very resistant to saponification, has a tensile strength of about 105 kg./cm.$^2$ and a breaking elongation of about 440%.

A material prepared in the same manner, but without addition of the antimony compound, must be left in the mold about 110 to about 120 minutes before it can be removed. The physical characteristics of the molded body are then: Tensile strength, about 110 kg./cm.$^2$ with about 380% breaking elongation.

*Example 7*

About 1548 parts by weight of ethylene glycol and about 3285 parts by weight of adipic acid are thermally esterified with simultaneous addition of about 3.8 parts by weight of bismuth trichloride to provide a polyester with the OH number about 55 and an acid number of about 1.0. About 850 parts by weight of the polyester prepared in this manner are mixed at about 115° C. with about 2.5 parts by weight of 4,4'-diphenyl methane diisocyanate. The temperature of the mass rises within about 3 minutes to about 123° C. After another 7 minutes, a mixture of about 55 parts by weight of 1,5-naphthalene-β-dihydroxyethyl ether with about 150 parts by weight of the aforementioned polyester, which mixture has been heated to about 145° C., is mixed with the said mass. The mixture is poured into waxed molds, which are heated to about 100° C. After about 12 minutes, a standard molded element can be removed. By heating for another 20 hours at about 110° C., there are obtained highly elastic molded bodies with a tensile strength of about 320 kg./cm.$^2$ and a breaking elongation of about 620%.

If the same process is carried out with a polyester which does not contain any addition of bismuth trichloride, the first reaction stage between the polyester and the 4,4'-diphenyl methane diisocyanate takes 5 minutes before the temperature maximum is reached. A standard molded element manufactured therefrom can be removed from the mold after about 25 minutes.

It is to be understood that any of the other metals or compounds of metals disclosed as a catalyst herein my be substituted in the foregoing examples for the catalyst specified and acceleration of the reaction will likewise be obtained.

The product of this invention may be used for making vehicle tires, machine parts, shoe soles or as a substitute for rubber in many other applications.

An essential advantage of the process according to the invention is that plastics are obtained which are light in color, these plastics also having an excellent structural strength, elasticity and resistance to aging. Furthermore, the setting time of the freshly manufactured plastic element is substantially shortened as compared with mixtures not containing metal, so that more articles can be manufactured in the same time as compared with previous processes.

It is already known to use metallic soap powders and metallic leafing powders as additive in the manufacture of porous polyurethanes to give an improved pore structure. These metal compounds are insoluble in the reaction medium. It, therefore, has been proposed to use instead liquid compounds of three- and higher valent metals in the manufacture of porous polyurethanes. These liquid metal compounds do not serve as reaction accelerators as can be seen from the fact that tertiary amine activators are always concurrently used with these liquid metal compounds. The reaction mechanism of the processes leading to porous polyurethanes and to homogeneous polyurethanes respectively are quite different which fact is illustrated by the following examples C and D. In the manufacture of homogeneous polyurethanes according to the present invention it is unnecessary to add an organic tertiary amine or the like for accelerating the process. Far more important, however, the addition of such an organic base will adversely affect the mechanical properties of the final product.

*Example A*

1548 parts of ethylene glycol and 3285 parts of adipic acid are esterified to give a polyester with the OH number 55, and the acid number 1.2. Esterification is performed in the presence of 0.05 part of titanium tetrabutylate. 1000 parts of the polyester thus obtained are mixed with 180 parts of 1.5-naphthylene diisocyanate at 126° C. 20 parts of 1.4-butylene glycol are introduced into the melt. The mass is poured into a waxed mold heated to 110° C. A test plate has the following physical properties:

| | |
|---|---|
| Tensile strength_____kg./cm.$^2$__ | 280 |
| Elongation at break_____percent__ | 750 |
| Structural strength_____kg./cm__ | 60 |
| Shore hardness at 20° C_____degrees__ | 79 |
| Shore hardness at 70° C_____do____ | 79 |
| Elasticity _____percent__ | 51 |
| Permanent elongation_____do____ | 19 |

*Example B*

The procedure of Example A is repeated. 10 parts of the adipic acid ester of N-diethyldiethanol amine are added to the polyester before reacting the polyester with 1,5-naphthylene diisocyanate. A blistery test plate is obtained having the following mechanical properties:

| | |
|---|---|
| Tensile strength_____kg./cm.$^2$__ | 190 |
| Elongation at break_____percent__ | 700 |
| Structural strength_____kg./cm__ | 58 |
| Shore hardness at 20° C_____degrees__ | 74 |
| Shore hardness at 70° C_____do____ | 73 |
| Elasticity _____percent__ | 54 |
| Permanent elongation_____do____ | 25 |

Whereas Examples A and B show that the presence of a tertiary amine catalyst in addition to the metal compounds of the invention is detrimental for the process the following Examples C and D show that the behavior of catalysts in the manufacture of polyurethane foams cannot be compared with the behavior in the manufacture of homogeneous polyurethane plastics.

*Example C*

Following the procedure of U.S. Patent 2,764,565 100 parts of a polyester prepared from 175.2 parts of adipic acid, 128.2 parts of diethylene glycol and 8.1 parts of trimethylol propane are mixed with 43.2 parts of toluylene diisocyanate, 3 parts of o-benzyloxydiphenyl polyglycol ether (54% water content), 1.5 part of a sulfonated castor oil (54% water content), 1 part of ricinoleic acid, 1 part of water, 0.3 part of paraffin oil and 1.2 part of dimethylbenzyl amine. The foaming mass has expanded within 1.5 minutes and completely cured after 15 minutes. Bulk density 35 kg./m.$^3$.

Example D

Instead of 1.5 part of dimethylbenzyl amine 1.2 part of titanium tetrabutylate is added to the foam formulation. The foamable mass has expanded after 30 minutes. Curing time is 48 hours. A heavy, cracked foam is obtained of a bulk density of about 60 kg./m.$^3$.

These Examples C and D clearly exhibit that it is not advisable to use the titanium compounds which are disclosed as being highly suitable in the manufacture of the present process in a procedure leading to porous polyurethanes. In fact, if no catalyst at all is involved in the foaming process the effect would be the same as in case of addition of titanium tetrabutylate.

It has already been proposed to use beryllium hydroxide as curing catalyst for isocyanate-based elastomers. Beryllium hydroxide, however, cannot compete with the new catalyst disclosed in the present specification as illustrated in Examples E and F. Example E shows the preparation of an isocyanate-based elastomer without a catalyst, Example F is related with the same elastomer manufacture in the presence of beryllium hydroxide.

Example E 500 parts of the polyester identified in the above Example 1 are mixed with 90 parts of 1.5-naphthylene diisocyanate at 125° C. After 16 minutes the reaction temperature does no longer rise, i.e. reaction is practically complete. 10 parts of a mixture consisting of 4 parts of trimethylol propane and 6 parts of 1.4-butane diol are added. Casting time of the reaction mixture is 5 minutes. A test plate can be taken from the mold after 70 minutes and is heated for 24 hours at 110° C.

Example F

The procedure of Example E is repeated in the presence of 250 mm. of beryllium hydroxide. The reaction rate as well as the casting time are unchanged. That means that beryllium hydroxide does not act as reaction accelerator. A test plate shows undissolved particles of beryllium hydroxide being distributed within the elastomer which inhomogeneity gives rise to bad mechanical properties. By comparison with Example 1, these Examples E and F clearly indicate that a higher reaction rate and a shorter casting time is observed when using the new catalysts claimed with the present application instead of beryllium hydroxide.

Still another kind of reaction mechanism is involved when in organic solvents soluble isocyanate-based polyaddition products are to be prepared. In such cases it is known to use a combination of an acid medium and a metal compound for regulating the reaction mechanism in order to avoid undesired side reactions. It has been found that such an acidic medium-metal compound-system is inoperative in the manufacture of homogeneous polyurethane plastics of non-porous rubber-like polyurethane plastics of the present process. Example G shows the additional use of terephthalic acid chloride as acid medium in the manufacture of isocyanate-based elastomers.

Example G

The same ingredients are used in the same proportions as in above Example 1. The only difference is that 1000 parts of the polyester contain 0.6 part of terephthalic acid chloride. Reaction of polyester and diisocyanate is practically completed after 14 minutes, i.e. the temperature of the reaction mixture does not rise any further. The time available for the casting operation is about 7 minutes. A standard molded element can be removed from the mold after about 1 hour and a half. The physical properties of the product are

| | | |
|---|---|---|
| Tensile strength | kg./cm.$^2$ | 240 |
| Elongation at break | percent | 650 |
| Structural strength | kg./cm. | 71 |
| Shore hardness at 20° C | degrees | 94 |
| Shore hardness at 70° C | do | 80 |
| Elasticity | percent | 39 |
| Permanent elongation | do | 35 |

Example H is concerned with the same ingredients as Example G. The only difference consists in using a mixture of terephthalic acid chloride and titanium tetrabutylate. There is no difference in the reaction times and the casting times. The physical properties are substantially the same in both the cases of Examples G and H. In any case, they are inferior to the physical properties of a non-porous rubber-like polyurethane plastic prepared only in the presence of a metal catalyst of the present application.

Example H

The same ingredients and the same amounts are employed as in Example 1 and Example G. Instead of 0.6 part of terephthalic acid chloride a mixture of 0.6 part of terephthalic acid chloride and 0.05 part of titanium tetrabutylate is added to each 1000 parts of polyester. After about 6 minutes the reaction of the polyester and the diisocyanate is practically completed, i.e. the temperature of the reaction mixture does not rise any further. After adding the 1.4-butylene glycol the time available for the casting operation is about 3.5 minutes. A standard molded element can be removed from the mold after about 6 minutes. The physical properties of the rubber-like elastomer are

| | | |
|---|---|---|
| Tensile strength | kg./cm.$^2$ | 245 |
| Elongation at break | percent | 640 |
| Structural strength | kg./cm. | 70 |
| Shore hardness at 20° C | degrees | 93 |
| Shore hardness at 70° C | do | 81 |
| Elasticity | percent | 40 |
| Permanent elongation | do | 35 |

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. In the preparation of a substantially nonporous, rubber-like polyurethane plastic by a process which comprises reacting an organic polyisocyanate with an organic compound having reactive hydrogen atoms, a molecular weight of at least about 500, an acid number of not more than about 2, and a hydroxyl number of not more than about 224, said organic compound having reactive hydrogens being capable of reacting with said organic polyisocyanate to form a polyurethane, the improvement which comprises effecting the reaction between the said organic compound having reactive hydrogens and the organic polyisocyanate in the presence of a catalytic amount of a catalyst selected from the group consisting of metallic gold, zinc, cadmium, titanium, antimony, bismuth, aurochlorohydric acid, bismuth nitrate, cadimum chloride, gold trichloride, bismuth trichloride, titanium tetrabutylate, zinc adipate, antimony oxide, disalicylal ethylene diimine-titanium hydroxy chloride, and antimonic acid triethyl ester.

2. The process of claim 1 wherein the organic compound having reactive hydrogen atoms, a molecular weight of at least about 500, an acid number of not more than about 2, and a hydroxyl number of not more than about 224, is a member selected from the group consisting of a hydroxyl polyester prepared by esterification of a polycarboxylic acid with an excess of a polyhydric alcohol, a polyhydric polyalkylene ether, and a polyhydric polythio ether.

3. The process of claim 1 wherein the organic polyisocyanate is 4,4′-diphenyl methane diisocyanate.

4. The process of claim 1 wherein the catalyst is antimony oxide.

5. The process of claim 1 wherein the catalyst is dissolved in the reaction mixture.

6. The process of claim 1 wherein the catalyst is metallic antimony.

7. The process of claim 1 wherein the catalyst is titanium tetrabutylate.

References Cited in the file of this patent

UNITED STATES PATENTS

| | | |
|---|---|---|
| 2,374,136 | Rothrock | Apr. 17, 1945 |
| 2,424,885 | Buist et al. | July 29, 1947 |
| 2,772,245 | Simon et al. | Nov. 27, 1956 |
| 2,799,663 | Hampton et al. | July 16, 1957 |
| 2,846,408 | Brochhagen et al. | Aug. 5, 1958 |
| 2,852,413 | Tischbein | Sept. 16, 1958 |
| 2,877,192 | Burkus | Mar. 10, 1959 |
| 2,879,251 | Seeger et al. | Mar. 24, 1959 |
| 2,897,181 | Windemuth | July 28, 1959 |
| 2,899,409 | Nesty et al. | Aug. 11, 1959 |
| 2,921,926 | Kehr | Jan. 19, 1960 |
| 2,921,927 | Csendes | Jan. 19, 1960 |

FOREIGN PATENTS

| | | |
|---|---|---|
| 154,256 | Australia | Nov. 19, 1953 |
| 779,806 | Great Britain | July 24, 1957 |
| 520,976 | France | July 15, 1953 |

OTHER REFERENCES

Windemuth, German patent application, No. F12977 printed Oct. 25, 1956 (KL IV b 39c).